May 12, 1959  H. C. DAVIS ET AL  2,886,619
DEFERRED ACTION BATTERY

Filed May 15, 1957  2 Sheets-Sheet 1

INVENTORS,
HOWARD C. DAVIS
BY  HERBERT H. KOUNS
*Harry M. Saragovitz*
ATTORNEY

May 12, 1959   H. C. DAVIS ET AL   2,886,619
DEFERRED ACTION BATTERY
Filed May 15, 1957   2 Sheets-Sheet 2
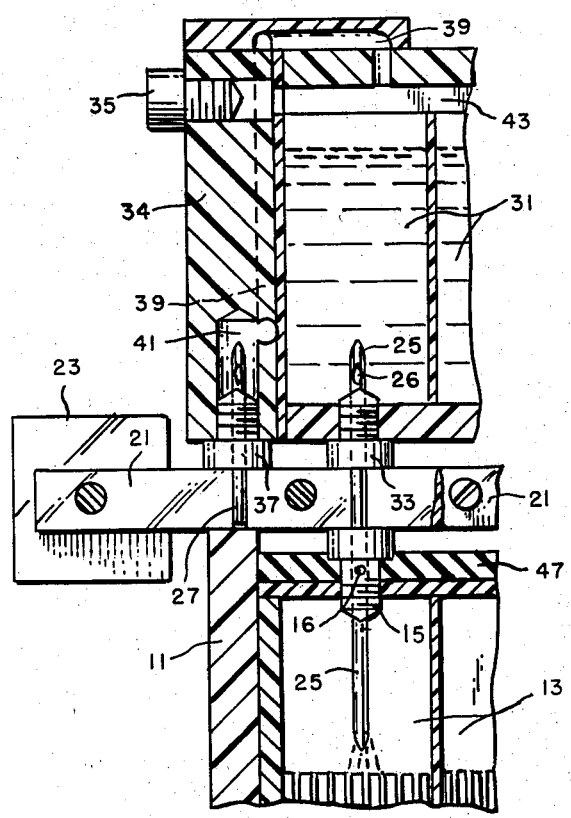
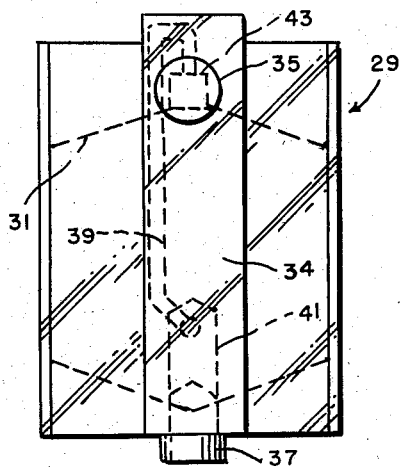
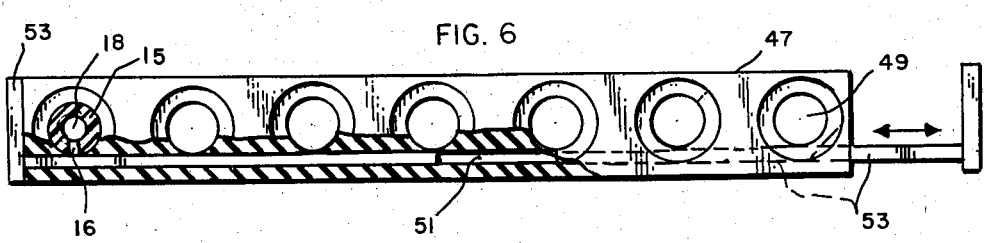
INVENTORS,
HOWARD C. DAVIS
HERBERT H. KOUNS
BY
*Harry M. Saragovitz*
ATTORNEY

United States Patent Office 2,886,619
Patented May 12, 1959

2,886,619

DEFERRED ACTION BATTERY

Howard C. Davis and Herbert H. Kouns, Columbus, Ohio

Application May 15, 1957, Serial No. 659,448

2 Claims. (Cl. 136—6)

The present invention relates to a battery and particularly to high discharge batteries of the silver-zinc alkali type. In many instances the requirement arises in battery utilization that large amounts of power be available. One of the difficulties encountered in meeting this requirement is that batteries capable of high output current have an inherently short "wet stand" life.

In order to reduce the amount of self discharge that commonly occurs when batteries are subjected to long shelf life, battery cells have individually been filled with fluid electrolyte, utilizing hypodermic syringes or the like, within a few hours of the time of use. This practice is usually accomplished manually oftentimes under adverse conditions, such as extremes of cold, etc.

It is an object of the present invention to provide a battery in which the liquid electrolyte can be added to a plurality or series of battery cells by a novel means with the battery cells contained within a confined inclosure and eliminating the need of manually adding the fluid electrolyte solution to individual cells as indicated above.

It is another object of the invention in which the battery cells are kept completely dry until the time of use and in which the electrolyte may be quickly supplied into the plurality of cells forming the battery herein.

It is another object of the invention to provide means for precluding the admission of any contaminants such as dust or the like into the battery cells prior to their activation.

Another object of the invention is to provide an alignment jig within which are contained the means for piercing the battery cells that can be readily made to align with relation to the battery cells.

Another object of the invention is to provide a self-aligned multicell electrolyte container whereby said container is readily aligned with the battery cells and said aforesaid jig.

A still further object of the invention is to provide means whereby the batteries can be resealed after activation to preclude any cells from shorting thru a common electrolyte path.

The above objectives and other features of the invention will be more readily understood from the following description to be read in view of the accompanying drawings, in which Fig. 1 is a front elevation view of a compartmented fluid electrolyte container.

Fig. 4 is a cross sectional view of the elements of Figs. 1, 2 and 3 when assembled and during the activation of a battery cell.

Fig. 5 is an end view of the electrolyte container of the device shown in Fig. 1, and Fig. 6 is a plan view partly cut away showing the battery manifold.

Figure 3:
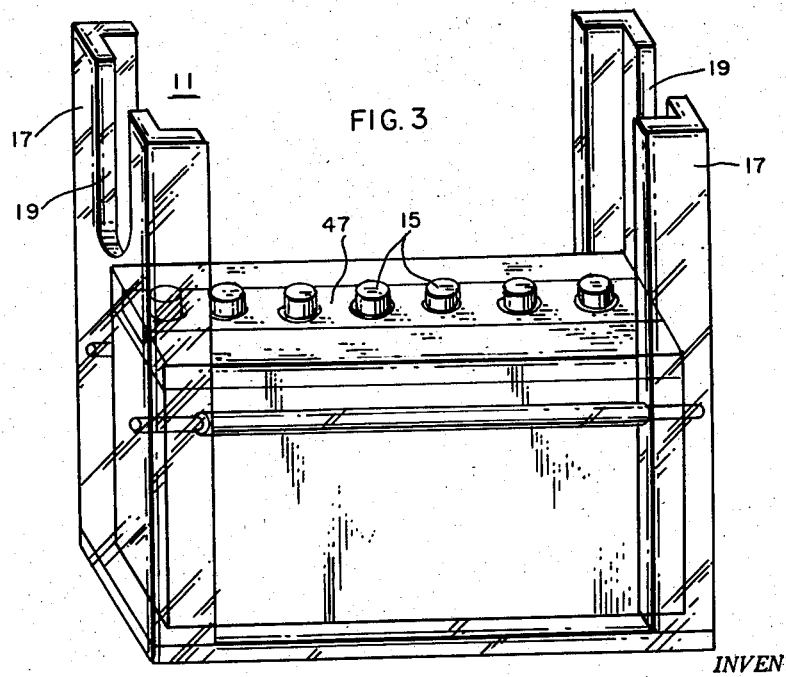
Fig. 3 is a view in perspective showing the battery casing and a series of battery cells therein.

Referring to the drawings and particularly to Fig. 3 there is shown an open casing 11 within which are contained and confined a plurality of battery cells 13 each of which is provided with caps 15 having a hollow shank as shown at 18. Each of the caps 15 is made of a frangible plastic or rubber that will permit itself to be readily pierced and further provided with an opening 16 in its hollow shank portion, the function of which will be hereinafter described. The ends of the walls of the casing 11 extend above the top of the battery casing as shown at 17 and thereby form a plurality of angle-shaped guide means and provided witht U-shaped cutouts 19 between adjacent extensions 17.

Figure 1:
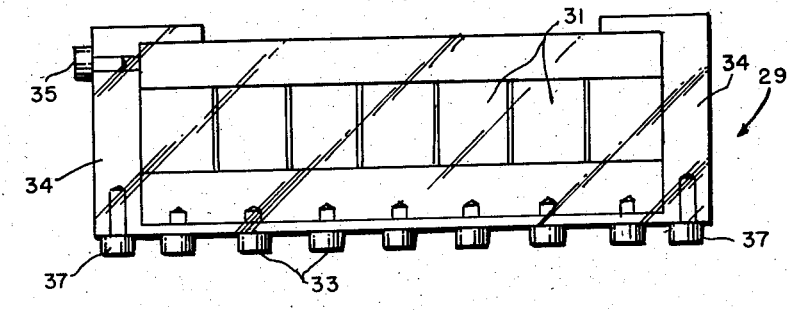
Figure 2:
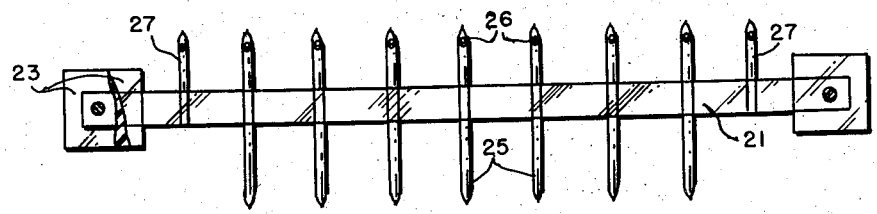
Fig. 2 is a front elevation view and partly broken away showing the needle holding jig.

In Fig. 2 there is shown a needle rack assembly including a cross piece 21 and terminating at each end in blocks 23. Extending thru the cross piece 21 are a plurality of hollow needles 25 terminating in tapered pointed ends as shown and also provided with notched openings 26. Adjacent to each block 23, the cross piece 21 is provided with venting needles 27 which extend beyond the top of the cross piece but terminate at the bottom surface of the cross piece. The function of the venting needles 27 will be described in greater detail hereinafter. The size and dimensions of the cross piece 21 and the spacing of the needles 25 from each other is such that when the cross piece 21 is fitted into the U-shaped cutouts 19 each of the needles 25 will be positioned directly above the battery caps 15 so that when the cross piece is urged downwardly each of the needles 25 pierces a battery cap 15 of each of the battery cells 13 and further downward movement of the rack 21 is limted by the depth of the cutout 19.

Completing the battery assembly is a compartmented electrolyte container designated generally as 29 terminating at each end in a block 34 and including a plurality of compartment 31 each of which is provided with a sealing cap 33 to confine the electrolyte within each of the compartments and a channel 43 extending lengthwise in the container and is in common communication with each of the compartments of the container. The caps 33 are made of a material similar to the battery caps 15, i.e., one that can be readily pierced. The spacing between the caps 33 is critical to the extent that each of such caps should be so spaced from each other so as to be in alignment with each of the needles 25 when the container 29 is placed directly over the needle rack 21 such as can be seen in a single instance in Fig. 4. The container 29 is completely sealed and means are provided comprising a plug 35 in the end block 34 which when withdrawn permits the means of admitting electrolyte into the various compartments 31 of the container. When it is desired to fill the container 29 with fluid electrolyte, the plug 35 is removed and the container is slightly tilted. A nozzle from a source of electrolyte is then introduced and electrolyte can be fed into the container 29 by gravity flow through channel 43 until all of the container compartments are filled to the desired depth. The base or bottom end of each of the end blocks 34 of container 29 is provided with a cavity 41 within which is threadably engaged a plug 37. The plugs 37 are similar to the caps 33 in being made of a frangible material. Extending from the top of the cavity 41 and confined within the end block 34, is an air duct 39 which terminates at its other end at channel 43. Each of the plugs 37 are so spaced, relative to the caps 33, that when the container 29 is positioned above the needle rack, each of said plugs will be directly over each of the venting needles 27. It is thus apparent, that when the plugs 37 are pierced by the needles 27 there will be a flow of air through the needles 27, the ducts 39, channel 43, and into electrolyte compartments 31.

In Fig. 6 there is shown a plastic-like battery manifold designated as 47 and including a series of openings 49 in which the battery caps 15 are positioned. Contained within the manifold 47 are the means for permitting venting of each of the battery cells 13 and for resealing of each of said cells after activation. Such means comprise a common venting passageway 51 extending lengthwise within the manifold 47 adjacent to one of the outer edges as shown and further characterized whereby the passageway 51 tangentially intersects each of the annular grooves forming each of the openings 49. Insertable within the passageway 51 are a pair of L-shaped plugs or rods 53 which fit snugly within the passageway when inserted into the passageway as shown in Fig. 6. It is thus readily apparent that when the rods 53 are within the passageway 51 of the manifold 47 there can be no communication between adjacent cells by a common electrolyte path. On the other hand, when said plugs are removed which can be readily accomplished by the short arm 55 of the L-shaped rod, it is apparent that an air passageway common to each of the cells is provided through the openings 16 of each of the battery caps 15.

When it is desired to activate a plurality of cells such as shown in Fig. 3, the needle containing rack is forced downwardly within the confines of the U-shaped cutout 19 and each of the separate needles 25 pierce discrete battery caps 15. The container 29 is then positioned within the confines of the extensions 17 whereby each of the caps 33 are directly positioned above their respective adjacent needles 25. In this position the venting needles 27 are directly beneath each of the venting plugs 37. The container 29 is then pressed downwardly and the sharp pointed ends of the needles will pierce each of the sealing caps 33 and the liquid electrolyte will flow readily into each of the cells directly beneath its companion compartment. To assist in the gravity flow of the liquid electrolyte thru the needles, air will enter thru the venting needles 27, permitting the flow of air through the cavity 41, through the channel 39, through the passageway 43 into each of the container compartments. At the same time or immediately prior thereto the rods 53 are withdrawn from the passageway 51 thereby permitting the flow of air into said passageway and into said battery cells through openings 16 in the caps 15. After such time has elapsed and it is felt that the battery cells are thoroughly activated the rods 53 are then inserted into the passageway 51 thereby insuring that there can be no cell-to-cell shorting by a common electrolyte path. The minute openings caused by the needles being forced through the battery caps 15 will be sufficient to permit the escape of any battery gases.

What is claimed is:

1. A deferred action type battery comprising in combination a separable completely enclosed housing for a plurality of cells including a manifold having a plurality of openings for accommodating a frangible cap having a hollow shank portion and an aperture therein for each of said cells and having a passageway common to each of said cap openings whereby when said passageway is opened a free flow of air will enter said battery cells thru said aperture and hollow shank portion of said battery cap, a separable compartmented fluid electrolyte container each of said compartments having a frangible port in respective register with each of the caps and cells and means intermediate said container and said housing comprising a plurality of hollow needles which pierce said caps and ports in register to permit the flow of fluid from said container to the cells in said housing.

2. A deferred action type battery comprising in combination a separable completely enclosed housing for a plurality of cells including a manifold having a plurality of openings for accommodating a frangible cap for each of said cells, said cap having a hollow shank portion and an aperture therein and having a passageway common to each of said cap openings whereby when said passageway is opened a free flow of air will enter into said battery cells thru said passageway, said aperture and the hollow shank portion of said battery cap, and a separable compartmented fluid electrolyte container each of said compartments having a frangible port in respective register with each of the caps of said cells and further provided with means in the ends of said container for permitting the flow of air into said container comprising a pair of discrete frangible venting ports which when pierced permit the free flow of air into said container and a rack containing a plurality of hollow needles extending above and below said rack for piercing the ports of said compartment and the caps of said batteries in register and further provided with venting needles at each end thereof to pierce said venting ports at each end of said electrolyte container.

References Cited in the file of this patent
UNITED STATES PATENTS

| | | |
|---|---|---|
| 1,218,847 | Firey | Mar. 13, 1917 |
| 2,732,985 | Howard | Jan. 31, 1956 |
| 2,763,706 | Barrett | Sept. 18, 1956 |
| 2,783,291 | Gold | Feb. 26, 1957 |
| 2,787,650 | Blaru II | Apr. 2, 1957 |
| 2,791,620 | Blarv | May 7, 1957 |
| 2,798,111 | Renke | July 2, 1957 |